G. G. GRIFFIN.
HUB CAP LOCK FOR VEHICLE WHEELS.
APPLICATION FILED NOV. 6, 1913.

1,166,983.

Patented Jan. 4, 1916.

WITNESSES:
A. H. Edgerton
O. M. McLaughlin

INVENTOR.
George G. Griffin.
BY
ATTORNEY.

UNITED STATES PATENT OFFICE.

GEORGE G. GRIFFIN, OF INDIANAPOLIS, INDIANA.

HUB-CAP LOCK FOR VEHICLE-WHEELS.

1,166,983.     Specification of Letters Patent.     Patented Jan. 4, 1916.

Application filed November 6, 1913. Serial No. 799,617.

*To all whom it may concern:*

Be it known that I, GEORGE G. GRIFFIN, a citizen of the United States, and a resident of Indianapolis, county of Marion, and State of Indiana, have invented a certain new and useful Hub-Cap Lock for Vehicle-Wheels; and I do hereby declare that the following is a full, clear, and exact description thereof, reference being had to the accompanying drawings, in which like letters refer to like parts.

In vehicle wheel hubs and mountings of certain types there has been difficulty in retaining the caps on the hubs.

The object of this invention is to overcome that difficulty and have a practical construction at the same time.

Figure 1:
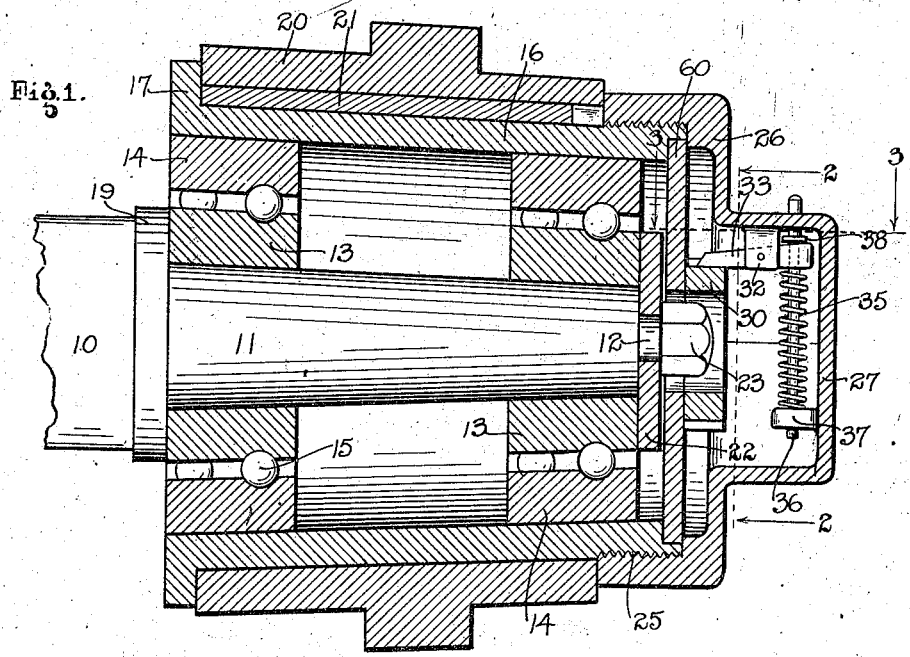
Figure 2:
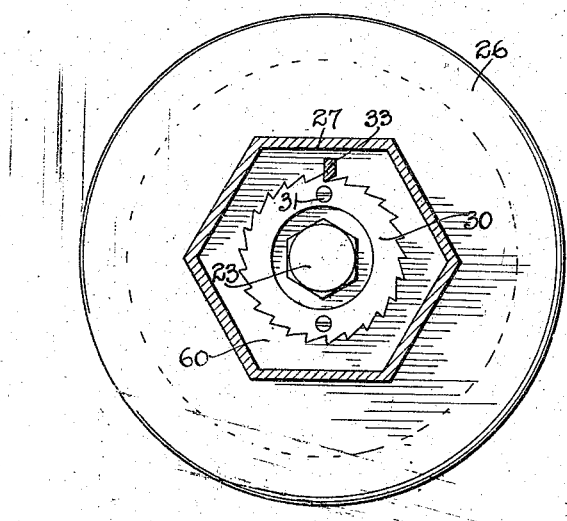
Figure 3:
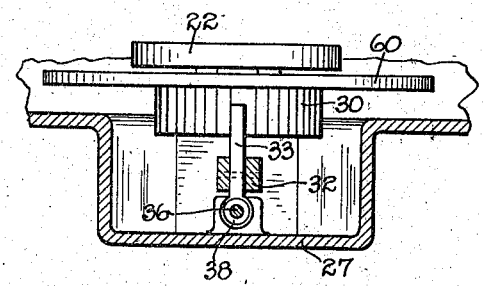

The nature of the invention will be understood from the accompanying drawings and the following description and claims:

In the drawings, Figure 1 is a central vertical longitudinal section through a hub and axle. Fig. 2 is a section on the line 2—2 of Fig. 1. Fig. 3 is a section on the line 3—3 of Fig. 1.

There appears herein an axle 10 of the ordinary type having a spindle 11 with a reduced threaded bolt 12 on the outer end thereof. On the spindle 11 a ball bearing construction is provided consisting of inner rings 13, outer rings 14 and balls 15. These bearing rings are surrounded by a sleeve 16 with an annular outwardly extending flange 17. The outer rings 14 and sleeve 16 are shrunk together or otherwise arranged so that they are practically secured together and a collar 19 on the axle limits the inward movement of the sleeve 16. The hub 20 surrounds the sleeve 16 and fits against its flange 17 and is keyed thereon by a key 21. A washer 22 is held against the bearing ring 13 by a nut 23 on the bolt 12.

A disk 60 surrounds a nut 23 and is held in place against sleeve 16 by cap 26. The outer end of sleeve 16 is externally threaded at 25 to receive the internally threaded portion of said cap 26. The cap has a central angular nut extension 27 to which a wrench may be applied for tightening and releasing the cap. Said cap overlaps a portion of the disk 60 near its periphery so that when the cap is in place, it clamps the disk 60 to sleeve 16 and the hub against flange 17, so as to make parts 14, 16 and 20 practically the hub.

A ratchet 30 is secured to the disk 60 by screws 31, and the teeth of the ratchet are inclined in the right-hand direction, that is, in the same direction as the cap is turned while being put on and tightened. In the nut extension 27 of the cap there is a pair of inwardly extending ears 32 in which a pawl lever 33 is fulcrumed between its ends and the parts are arranged so that the inner end of said pawl lever rides on the ratchet and enters the spaces between the ratchet teeth. The inner end of such pawl lever is forced into locking engagement with said ratchet by a spiral spring 35 which surrounds a rod 36 and lies between the pawl lever 33 and a bearing 37 in the nut extension 27 of the cap. The rod 36 lies radially within the nut extension 27 and at one end projects outwardly beyond the same so that said rod may be pushed longitudinally inward against the resistance of the spring 35 and by means of a collar 38 on said rod and which engages the pawl lever 33, may release the pawl lever from the ratchet, when it is desired to release or remove the cap.

With this construction the cap is screwed into place and as it is thus screwed into place the pawl lever 33 rides over the ratchet 30 until the cap gets screwed tightly into place and then the cap cannot return or be released in any manner excepting when a person shall force the rod 36 inward and release the pawl lever. When this is done, the cap can be unscrewed as usual.

In the claims the word "hub" is used to mean the hub construction including the parts rigid and rotating with the hub.

The invention is:

1. The combination of the hub of a vehicle wheel suitably threaded, a cap arranged to screw on said hub, a ratchet disk secured centrally in connection with said hub, bearing means extending inwardly from said cap, a pawl lever pivoted in said bearing means between its ends parallel with the axis of the ratchet disk and with the inner end thereof adapted to enter a notch in the ratchet disk, a rod mounted radially in said cap with one end projecting outwardly therefrom so as to be longitudinally movable, and a stop on said rod for engaging one end of said pawl lever and releasing the same when the rod is actuated in one direction.

2. The combination of the hub of a vehicle wheel suitably threaded, a cap arranged to screw on said hub, a ratchet disk secured centrally in connection with said hub, bearing means extending inwardly from said cap, a pawl lever pivoted in said bearing means between its ends with the inner end thereof adapted to enter a notch in the ratchet disk, a rod mounted in said cap with one end projecting outwardly therefrom and so as to be longitudinally movable, a stop on said rod for engaging the end of said pawl lever and releasing the same when the rod is actuated in one direction, and a spring surrounding said rod acting against said pawl lever for forcing it in the other direction and into locking engagement.

In witness whereof, I have hereunto affixed my signature in the presence of the witnesses herein named.

GEORGE G. GRIFFIN.

Witnesses:
J. H. WELLS,
O. M. McLAUGHLIN.